(12) United States Patent
Joos

(10) Patent No.: US 9,687,872 B2
(45) Date of Patent: Jun. 27, 2017

(54) SYSTEMS AND METHODS FOR DISPENSING A FLUID

(71) Applicant: Corning Incorporated, Corning, NY (US)

(72) Inventor: Felipe Miguel Joos, Addison, NY (US)

(73) Assignee: Corning Incorporated, Corning, NY (US)

(*) Notice: Subject to any disclaimer, the term of this patent is extended or adjusted under 35 U.S.C. 154(b) by 143 days.

(21) Appl. No.: 14/271,700

(22) Filed: May 7, 2014

(65) Prior Publication Data
US 2014/0242283 A1     Aug. 28, 2014

Related U.S. Application Data

(62) Division of application No. 12/846,039, filed on Jul. 29, 2010, now Pat. No. 8,752,501.

(51) Int. Cl.
| | |
|---|---|
| *B05C 5/02* | (2006.01) |
| *B05D 1/26* | (2006.01) |
| *B29C 47/12* | (2006.01) |
| *B29C 47/14* | (2006.01) |

(Continued)

(52) U.S. Cl.
CPC ............ *B05C 5/0254* (2013.01); *B05D 1/26* (2013.01); *B05D 1/265* (2013.01); *B29C 47/026* (2013.01); *B29C 47/12* (2013.01); *B29C 47/14* (2013.01); *B29C 47/16* (2013.01); *B29C 47/165* (2013.01)

(58) Field of Classification Search
None
See application file for complete search history.

(56) References Cited

U.S. PATENT DOCUMENTS

| | | | |
|---|---|---|---|
| 4,299,186 A | 11/1981 | Pipkin et al. | 118/407 |
| 4,521,268 A | 6/1985 | Bok | 156/345.22 |
| 4,774,109 A | 9/1988 | Hadzimihalis et al. | 427/286 |

(Continued)

FOREIGN PATENT DOCUMENTS

| | | |
|---|---|---|
| JP | 11-188301 | 7/1999 |
| WO | 00-50215 | 8/2000 |

OTHER PUBLICATIONS

Weinstein, "Coating Flows" Annu. Rev. Mech 2004 36:29-53, Eastman Kodak Company Rochester, NY.

(Continued)

*Primary Examiner* — Binu Thomas
(74) *Attorney, Agent, or Firm* — John L. Haack

(57) ABSTRACT

A fluid dispensing system may include a first die portion having a first face defining a first edge and a second die portion spaced from the first die portion and having a second face facing the first face and defining a second edge, wherein the first edge and the second edge define a fluid outlet opening. The fluid dispensing system may also include a fluid inlet for introducing fluid to a region between the first face and the second face, and a cavity in flow communication with the fluid inlet, wherein the cavity opens to the region between the first face and the second face. The fluid dispensing system may further include a shim disposed between the first die portion and the second die portion to maintain the spaced positioning of the first and second die portions, wherein the shim defines a plurality of channels bounded by the first and second faces and extending from the cavity in a direction toward the fluid outlet.

10 Claims, 4 Drawing Sheets

(51) Int. Cl.
B29C 47/16 (2006.01)
B29C 47/02 (2006.01)

(56) References Cited

U.S. PATENT DOCUMENTS

| | | | |
|---|---|---|---|
| 4,844,004 A | | 7/1989 | Hadzimihalis et al. |
| 5,318,804 A | | 6/1994 | Yoshida |
| 5,503,336 A | * | 4/1996 | Wichmann ................ B05B 5/16 |
| | | | 239/590.5 |
| 5,853,482 A | | 12/1998 | Gartmann et al. |
| 6,478,483 B2 | | 11/2002 | Maruyama et al. |
| 6,537,376 B1 | | 3/2003 | Yasui et al. |
| 7,097,673 B2 | | 8/2006 | Dudley et al. ................ 429/246 |
| 7,291,362 B2 | | 11/2007 | Pekurovsky et al. ......... 427/356 |
| 7,591,903 B2 | | 9/2009 | Maier et al. .................. 118/411 |
| 7,625,449 B2 | | 12/2009 | Pekurovsky et al. ......... 118/419 |
| 2003/0097981 A1 | | 5/2003 | Dick et al. .................... 118/410 |

OTHER PUBLICATIONS

Dr. Hermann Schlichting, "Boundary-Layer Theory", McGraw-Hill Series in Mechanical Engineering $6^{th}$ Edition, 1968, p. 116.
Warren M. Rohsennow et al, "Heat, Mass, and Momentum Transfer". Prentice-Hall Series in Engineering of the Physical Sciences, 1961, p. 34.
Ronald F. Probstein, "Physicochemical Hydrodynamics, An Introduction", Butterworth-Heinemann, 1989, pp. 272 and 285.
JP1999188301 Machine translation.
JP2013-521806 Office Action.
CN201180036660.X Search Report.

\* cited by examiner

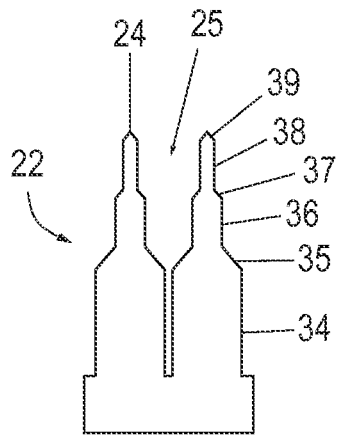
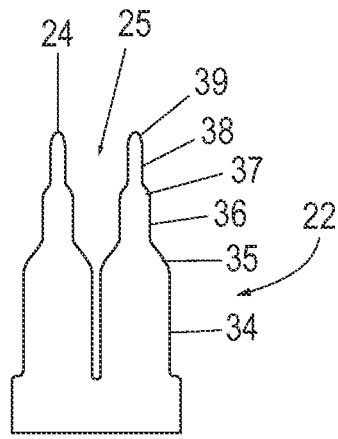
FIG. 3a  FIG. 3b
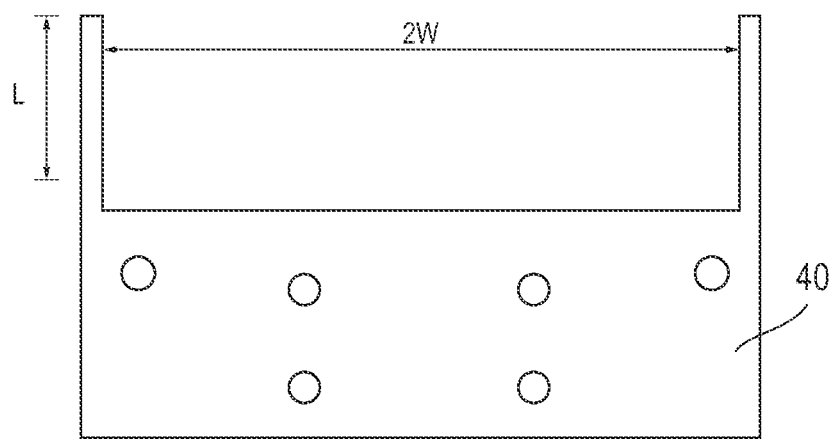
FIG. 4

SYSTEMS AND METHODS FOR DISPENSING A FLUID

CROSS-REFERENCE TO RELATED APPLICATIONS

This is a divisional of U.S. patent application Ser. No. 12/846,039 filed on Jul. 29, 2010, the content of which is relied upon and incorporated herein by reference in its entirety, and the benefit of priority under 35 U.S.C. §120 is hereby claimed.

FIELD OF THE DISCLOSURE

The disclosure relates to systems and methods for dispensing a fluid. In particular, the disclosure relates to systems and methods for dispensing a fluid to coat a substrate using a slot coating die. The disclosure further relates to shims for a slot coating die.

BACKGROUND

Coating and printing processes can involve the application of a thin film of fluid material (i.e., a coating) to a substrate, such as, for example, paper, fabric, film, foil or sheet stock. In many cases, coatings are applied to improve the surface properties of the substrate, such as the substrate's appearance, adhesion, wetability, corrosion resistance, wear resistance, and scratch resistance. In various cases, including printing processes and semiconductor fabrication, coatings may also form an essential part of the finished product.

A conventional slot coating die comprises a cavity in fluid communication with an applicator slot. Pressurized fluid is introduced into the cavity, and is then extruded out of the slot onto the desired substrate. The fluid exiting the slot generally emerges into a narrow gap between the die and the substrate, thereby forming a coating bead. If the fluid emerges at a uniform flow rate per unit slot width, the coating bead being applied to the substrate has a substantially uniform shape (e.g., thickness).

Slot coating dies are therefore generally designed to provide a high-pressure build-up along the slot (i.e., between the cavity and the outlet of the slot) to control the flow rate of a fluid flowing in and from the slot. The die may be designed such that the flow from a fluid inlet of the die to the cavity experiences a much lower pressure drop than the flow along the slot (i.e., the flow from the cavity to the outlet of the slot). Fluid flow may therefore be controlled by the pressure drop along the slot so as to provide a uniform fluid flow rate per unit slot width for fluid exiting the slot.

Coating substrates with fluids having low viscosities and/or ultra-low flow rates poses various challenges. Recent attempts to coat substrates at substantially low speeds using such fluids and conventional slot coating dies have generally resulted in coatings of erratic widths. When operating under ultra-low flow conditions, for example, conventional slot coating dies may provide coatings with a non-uniform thickness that pull or "neck" inward such that the coating is relatively thick in the center and relatively thin along the edges, thereby requiring the application of edge guides (i.e. mechanical aids to draw the dispensed material back to a substantially uniform and predictable width). In other words, without an edge guide, the width of the coating bead may become less than the width of the slot, forming a weak bead that may fail. Such difficulties make it hard to establish a bead when a coating is first applied to a substrate, resulting in slow start up times and wasted materials, including coating material and substrates.

There exists a need, therefore, for a coating technique and die that will maintain a relatively high pressure drop along the slot under ultra-low flow conditions. There also exists a need for a coating technique and die that may dispense fluids having low viscosities and/or ultra-low flow rates at a uniform flow rate, providing a fluid coating that maintains its widthwise uniformity and a coating bead that maintains its integrity without the need for edge guides. There also exists a need for a slot coating die that provides quick start up times for coating and printing processes.

SUMMARY

The disclosure may solve one or more of the above-mentioned problems and/or may demonstrate one or more of the above-mentioned needs. Other features and/or advantages may become apparent from the description that follows.

In accordance with various exemplary embodiments of the present disclosure, a fluid dispensing system may comprise a first die portion having a first face defining a first edge and a second die portion spaced from the first die portion and having a second face facing the first face and defining a second edge, wherein the first edge and the second edge define a fluid outlet opening. The fluid dispensing system may also comprise a fluid inlet for introducing fluid to a region between the first face and the second face and a cavity in flow communication with the fluid inlet, wherein the cavity opens to the region between the first face and the second face. The fluid dispensing system may further comprise a shim disposed between the first die portion and the second die portion to maintain the spaced positioning of the first and second die portions, wherein the shim defines a plurality of channels bounded by the first and second faces and extending from the cavity in a direction toward the fluid outlet.

In accordance with various additional exemplary embodiments of the present disclosure, a shim for a slot coating die may comprise a base portion defining an edge; and a plurality of fingers, each finger extending longitudinally and in the same direction from the edge of the base portion to a free end of each finger, wherein the base portion and the plurality of fingers define a substantially planar body.

In accordance with various further exemplary embodiments of the present disclosure, a method for dispensing a fluid may comprise introducing a fluid for dispensing into a cavity, the cavity being in fluid communication with a slot of a slot coating die, and flowing the fluid from the cavity through a plurality of channels disposed in the slot.

Additional objects and advantages will be set forth in part in the description which follows, and in part will be obvious from the description, or may be learned by practice of the disclosure. The objects and advantages may be realized and attained by means of the elements and combinations particularly pointed out in the appended claims and their equivalents.

BRIEF DESCRIPTION OF THE DRAWINGS

The disclosure can be understood from the following detailed description either alone or together with the accompanying drawings. The drawings are included to provide a further understanding of the disclosure, and are incorporated in and constitute a part of this specification. The drawings illustrate one or more embodiments of the disclosure and together with the description serve to explain the principles and operation.

FIG. 3A is a plan view of an exemplary embodiment of fingers for use in a shim in accordance with the disclosure;

FIG. 3B is a plan view of another exemplary embodiment of fingers for use in a shim in accordance with the disclosure.

FIG. 4 is a plan view of a conventional shim;

DETAILED DESCRIPTION

Figure 1:
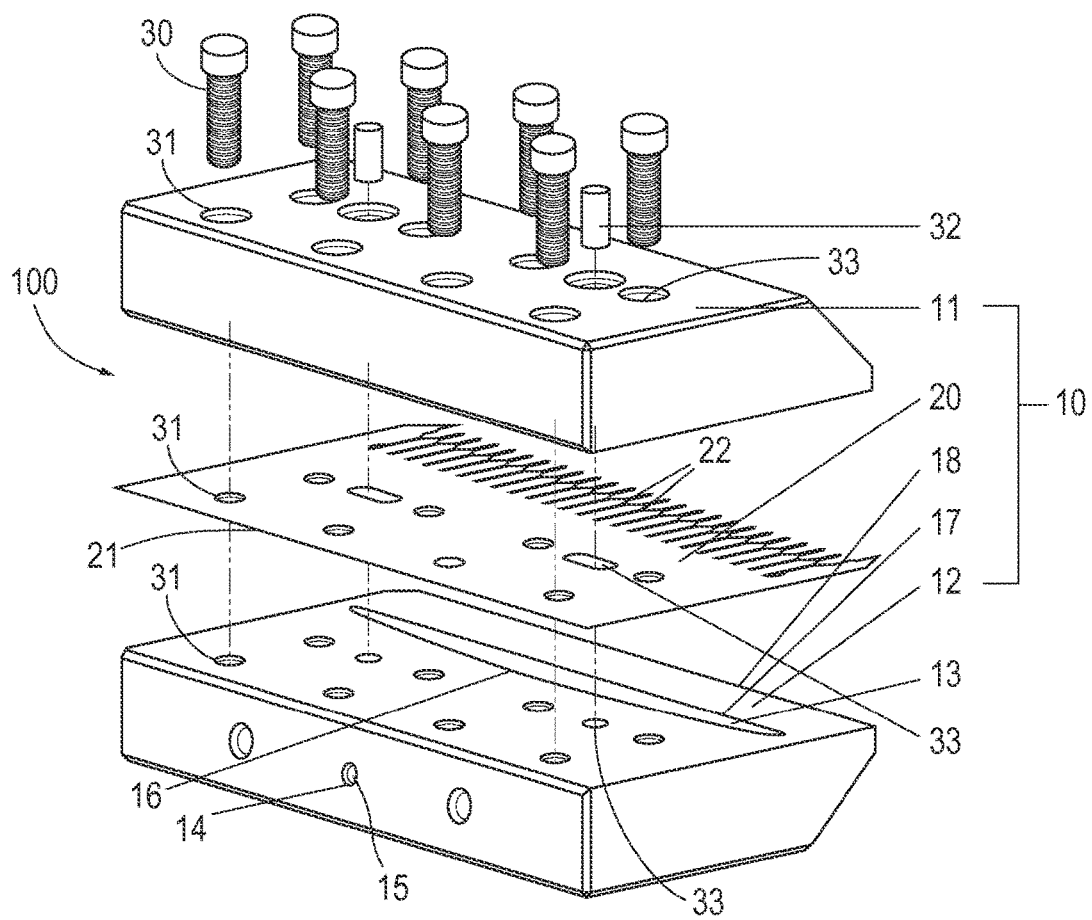
FIG. 1 is an exploded perspective view of an exemplary embodiment of a fluid dispensing system in accordance with the disclosure.

It is to be understood that both the foregoing general description and the following detailed description are exemplary and explanatory only and are not restrictive of the present disclosure, as claimed. Other embodiments will be apparent to those ordinarily skilled in the art from consideration of the specification and practice of the embodiments disclosed herein. It is intended that the specification and examples be considered as exemplary only.

As used herein, the definite articles "a," "an," and "the" mean "at least one," and should not be limited to "only one" unless explicitly indicated to the contrary. Furthermore, as used herein, the term "include" and its grammatical variants are intended to be non-limiting, such that recitation of items in a list is not to the exclusion of other like items that can be substituted or added to the listed items.

The terms "length," "width," "height," and "thickness," as used herein are used consistently with those relative dimensions indicated in the drawings. It should be understood, however, that the various orientations of components in the drawings are exemplary and the components could have other orientations without changing the use of the dimensional terminologies above.

Figure 2:
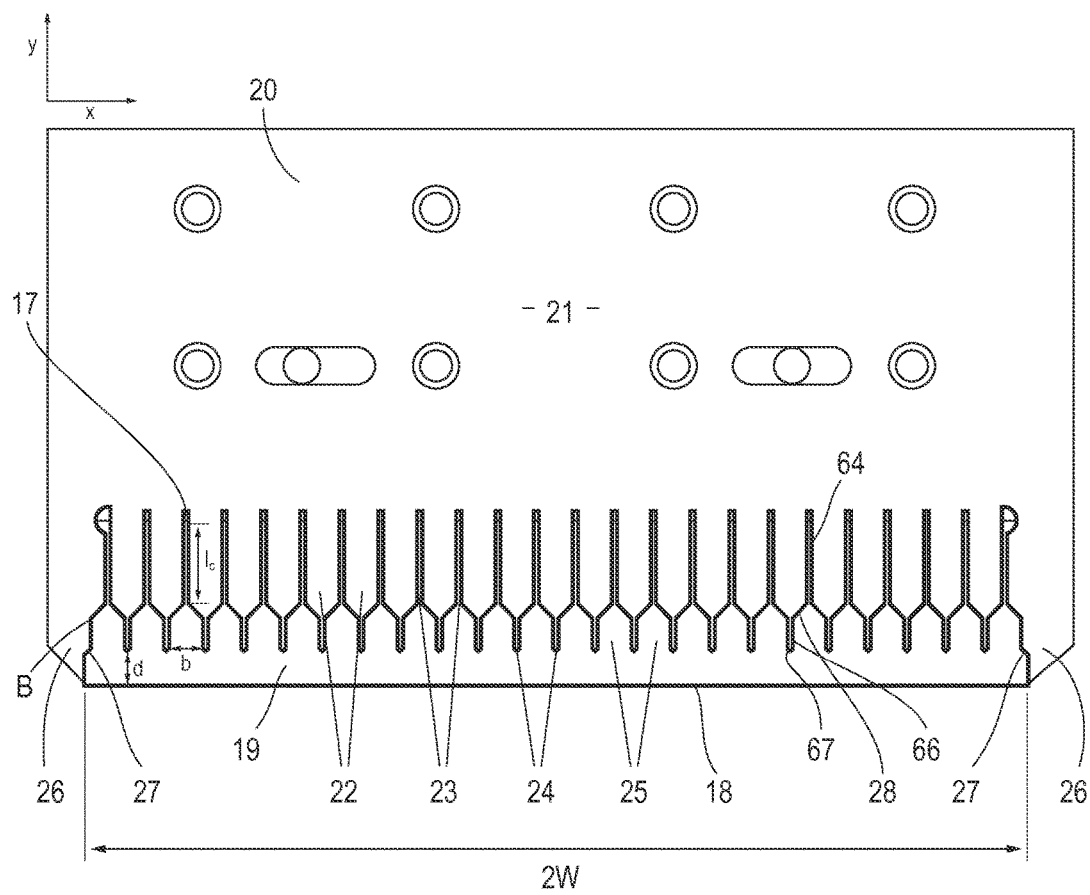
FIG. 2 is a plan view of a shim as assembled in the system of FIG. 1 and according to at least one embodiment of the disclosure.
Figure 5:
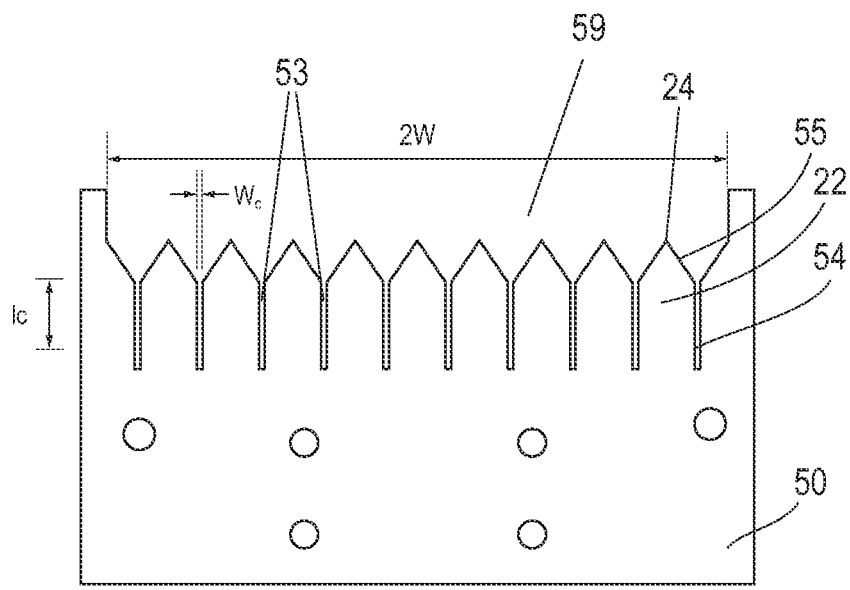
FIG. 5 is a plan view of another exemplary embodiment of a shim in accordance with the disclosure.

The disclosure relates to systems and methods to dispense a fluid to coat a substrate, and in particular to use of a slot coating die for such dispensing. For a coating layer to be uniformly applied to a substrate, the width of the coating bead should be substantially equal to the width of a slot of the slot coating die (e.g., 2W as shown in FIGS. 2, 4 and 5). As is known to those ordinarily skilled in the art, there is a relationship that relates a thickness of the coated film with a pressure in the coating bead. To achieve uniformity, the forces surrounding the coating bead should balance this pressure. Otherwise, the bead may take a different shape (e.g., widen, neck-in, or break up) to balance the forces. Necking in, for example, is a precursor to bead break up, and may occur when the pressure in the bead becomes too sub-atmospheric to sustain the balance of forces. Consequently, the coating fluid may rearrange itself in the bead through cross flow in the slot, thereby locally maintaining the bead's integrity while sacrificing uniformity. By increasing the backpressure in the cavity (which improves manifolding) and restricting cross flow in the slot, the devices, systems and methods of the present disclosure may delay this effect.

In various exemplary embodiments, a fluid dispensing system may comprise a shim disposed between a first die portion and a second die portion of a slot coating die. The shim may define lateral edges of a slot within the slot coating die and a plurality of channels extending along a length direction of the slot (i.e., in a direction from a fluid dispensing cavity toward a fluid outlet of the slot). During fluid dispensing, pressurized fluid entering the slot flows through the channels. Upon exiting the channels, the fluid can flow into a plurality of fluid expansion zones before exiting the slot and being transferred, for example, to a substrate moving perpendicular to the outlet of the slot (i.e., moving perpendicular to an external edge of the slot). The channels may be arranged and dimensioned to provide a high-pressure build up of the fluid flowing in the slot (i.e., between the cavity and the slot outlet) for fluids having low viscosities and/or ultra-low flow rates. This may provide a uniform fluid flow rate per unit slot width (e.g., 2W as shown in FIGS. 2, 4 and 5) for the fluid exiting the slot, and a coating layer that maintains its widthwise uniformity without, for example, the need for edge guides.

Slot coating dies are typically fed from their center (i.e., using a fluid inlet that is positioned at the center of the cavity). As used herein, a pressure drop along the cavity is measured between a fluid inlet and the ends of the cavity that are exposed by the shim. This is defined, for example, as a width W. Thus, the total width of the exposed cavity (and of the fluid coating) is 2W. If, however, a die is fed from one side only, the width of the exposed cavity (and of the fluid coating) is just W. For consistency, the total flow rate entering the die is also defined as 2Q for center-fed dies, and Q for side-fed dies (i.e., a die fed from one side only). For ease of discussion only, in this disclosure, it will be assumed that the die is center-fed (i.e., 2W and 2Q will be used). However, as those of ordinary skill in the art would understand, if the above convention is maintained, the disclosed equations are also valid for side-fed dyes.

As used herein, the terms "die" or "slot coating die" refer to a shaped body or block comprising one or more portions through which a fluid material is extruded or drawn. In various exemplary embodiments, for example, a die may comprise two die portions (e.g., first and second die portions). A slot can be formed within the die by placing a thin, substantially planar sheet of material, referred to herein as a shim, between the die portions to maintain a small spacing between the die portions. It is within the ability of one ordinarily skilled in the art to determine an appropriate geometry and/or configuration for the die, including the appropriate number and/or configuration of the die portions.

It is also within the ability of one of ordinary skill in the art to select an appropriate material for the die and the shim, considering, for example, properties relevant to any particular embodiment, such as the cost, strength, and/or corrosion resistance of a given material. In various embodiments of the disclosure, the material for the die and the shim may be chosen from aluminum, ceramic, titanium, nickel, copper, tin, tungsten, molybdenum, steel, stainless steel, alloys, and/or a combination thereof. In at least one embodiment, the die and the shim may comprise steel.

In various exemplary embodiments, the die may comprise a cavity in fluid communication with the slot. The cavity is configured to receive fluid from a fluid inlet to the die. As used herein, the terms "fluid," "fluid material," "fluid coating" or "coating" refer to a liquid material for coating a substrate. The liquid material may also contain another phase, such as a solid particulate in a liquid, or pockets of gas in a liquid. Non-limiting, exemplary fluid materials may include, for example, homogeneous coating liquids, including polymers dissolved in solvent, such as ink adhesion primers, monomers, and various clear protective coatings, and heterogeneous coating liquids, including but not limited to reacting and non-reacting lattices, emulsions, and slurries.

In various exemplary embodiments, fluid materials may include fluids having low viscosities and ultra-low flow rates. As used herein, the terms "ultra-low flow rates" or "ultra-low flow conditions" refer to fluid materials with low capillary number flow, wherein the flow is characterized by the following relation:

$$\frac{\mu_b}{\mu_s}\left(\frac{\sigma}{\mu_b S}\right)^{1/3}\frac{h^3}{L\delta^2} \geq 1 \qquad [1]$$

wherein $\mu_b$ is the effective viscosity of the fluid in the coating bead, $\mu_s$ is the characteristic viscosity of the fluid in the slot, S is the speed of the substrate's movement past the slot as it is being coated, $\sigma$ is the surface tension of a liquid-gas interface (i.e., the surface of the fluid coating), h is the height of the slot (i.e., the thickness of the shim), L is the length of the slot (i.e., the distance between the cavity and the outlet of the slot), and $\delta$ is the thickness of the wet fluid film just as it is coated on the substrate. The above relationship is derived, for example, below as equation [6].

As would be understood by those of ordinary skill in the art, a coating bead may begin to "neck in" when flow conditions, as represented by equation [1], are greater than or equal to 0.1. For values in the range of 0.1 to 1, necking may be concern, while for values of 1 and greater, undesired necking will likely occur absent preventative measures.

Non-limiting, exemplary fluid materials having ultra-low flow rates may include, for example, fluids containing nanoparticles and nanotubes, PTFE (polytetrafluoroethylene), marketed under the trade designation TEFLON®, and acetal polyoxymethylene, marketed under the trade designation DELRIN®, both commercially manufactured by DuPont™. Other fluid materials may include release polymers, such as fluoropolymers, including basic monomers, such as, tetrafluoroethylene (TFE), vinyl fluoride (VF), perfluoroalkylvinylether (PAVE), 2-2-Bistrifluoromethyl-4, 5difluoro-1,3-dioxole (PDD), vinylidene fluoride (VDE), hexafluoropropylene (HFP), and chlorotrifluoroethylene (CTFE); and polymers, such as, fluorinated ethylene propylene (surface energy of about 18-22 dynes/cm), polyvinyl fluoride (surface energy of about 28 dynes/cm), polyethylene copolymer (surface energy of about 20-24 dynes/cm), and silicones (surface energy of about 24 dynes/cm). Other fluid materials may contain gelatins, glycerin, and syrups (e.g., corn syrup).

As used herein, the term "substrate" refers to a support for receiving a fluid coating having a substantially planar surface to which the fluid is dispensed. In other words, a substrate can be any continuous or discrete article requiring coating. A substrate may, for example, be a flexible web or a rigid panel. Non-limiting, exemplary substrates may include, for example, paper, fabric, film, foil or sheet stock.

With reference now to FIG. 1, an exploded perspective view of one exemplary embodiment of a fluid dispensing system 100 is shown. The fluid dispensing system 100 comprises a die 10 and a shim 20. In various embodiments, as depicted in FIG. 1, the die 10 comprises a first die portion 11 and a second die portion 12. As shown in FIG. 1, in various embodiments, the second die portion 12 may define a cavity 13. The cavity 13 may be elongated in a widthwise direction of the die (e.g., in a direction transverse to a direction of fluid flowing out of the cavity 13 as will be described further below). The cavity 13 may be bounded by a first cavity edge 16 and a second cavity edge 17 that extend along the elongated direction of the cavity 13. During fluid dispensing, the cavity 13 receives fluid from a fluid inlet to the die 10, for example, fluid inlet orifice 14 formed from a central bore 15 in the second die portion 12, as shown in FIG. 1.

It is within the ability of one ordinarily skilled in the art to determine an appropriate size, geometry and/or configuration for the cavity 13, inlet 14, and bore 15, including an appropriate number of inlets and corresponding bores. In various embodiments, for example, the die 10 may comprise multiple fluid inlets 14 and multiple bores 15 into the cavity 13. Those of ordinary skill in the art would, therefore, understand that the cavity 13, inlet 14, and bore 15 may comprise various shapes and sizes depending on a particular application, and are not intended to be limited in any way by the exemplary embodiment discussed above.

Upon assembly of the fluid dispensing system 100, a slot is created by placing the shim 20 between the first die portion 11 and the second die portion 12. As shown in FIG. 1, in various embodiments, the die portions 11 and 12, and the shim 20 may be accurately aligned for assembly via dowel pins 32. Dowel pins 32 may, for example, be aligned with corresponding dowel holes 33 in the shim 20, the first die portion 11 and the second die portion 12. The first die portion 11 may be secured to the second die portion 12 via fasteners, such as, for example, bolts 30. Bolts 30 may be screwed, for example, into corresponding bolt holes 31 in the shim 20 and in the first die portion 11 and the second die portion 12. Those of ordinary skill in the art would understand, however, that the die portions 11 and 12 may be secured using various fastening mechanisms, including, but not limited to, various types of screws, bolts, adhesives and/or welding mechanisms.

It is also within the ability of one skilled in the art to determine the appropriate type, number, and/or configuration of dowel pins 32 and bolts 30, including the appropriate number and/or configuration of corresponding dowel holes 33 and bolt holes 31. Those of ordinary skill in the art would, therefore, understand that various types, sizes, numbers, and/or configurations of pins, bolts and/or holes can be used without departing from the scope of the present disclosure.

Referring now to FIG. 2, a cut-away plan view of the shim 20 as assembled in the system of FIG. 1 is shown. As illustrated in FIG. 2, the shim 20 is a substantially planar structure having overall width (in the x-direction depicted in FIG. 2) and length dimensions (in the y-direction depicted in FIG. 2). In the exemplary embodiment of FIG. 2, the shim 20 is elongated in the widthwise direction. The shim 20 comprises a base portion 21 and lateral edge extensions 26 that extend from the base portion 21. In various embodiments, for example, when assembled with the die portions 11 and 12, the lateral edge extensions 26 extend along a lengthwise direction of the die 10 from the base 21 substantially to the die fluid outlet 18 (see FIG. 1). As would be understood by one of ordinary skill in the art, upon assembly of the system 100, the shim 20 and the die portions 11 and 12 in combination define the dimensions of the slot 19. The lateral edge extensions 26 have inner edges 27 between which a plurality of fingers 22 are disposed.

As illustrated in FIG. 2, the fingers 22 extend longitudinally from the base portion 21 in the same direction as the lateral edge extensions 26 (i.e., along a lengthwise direction of the shim 20). The fingers 22 are connected to the base portion 21 at one end and terminate in free ends 24. The base portion 21 and the fingers 22, therefore, define a substantially planar structure.

The fingers 22 may be spaced apart relative to each other such that consecutive fingers 22 define a gap therebetween. Depending on the shape of the fingers 22, the gap between the fingers may be nonuniform and vary along the lengthwise direction of the fingers 22.

Thus, when assembled between the die portions 11 and 12, a slot 19 is defined by the inner lateral edges 27 of the shim, the edge of the base portion 21 from which the fingers 22 extend, and the respective surfaces of the die portions 11 and 12 that face the shim 20 as illustrated by the bolded curve B in FIG. 2. In the plan view of FIG. 2, the slot 19 is depicted only in two dimensions and the thickness of the slot defined by the spacing between the two die portions 11 and 12 is not depicted.

In various exemplary embodiments, for example, the slot 19 can have a width (i.e., 2W) of about 0.5 inches to about 10 inches.

When the die 10 is assembled with the shim 20 positioned between the first die portion 11 and the second die portion 12, for example, the spacing between the fingers 22 may define a plurality of channels 23. The channels 23 may be configured to receive fluid flowing from the cavity 13 to flow the fluid through the die and to a substrate to be coated, as will explained in more detail below. The cavity 13 is in fluid communication with the slot 19 and provides fluid to the slot 19 during fluid dispensing. In various embodiments, for example, the channels 23 are in direct flow communication with the cavity 13 and extend in a direction of fluid flow through the slot 19 during fluid dispensing (i.e., in the lengthwise direction of the shim 20). As shown in FIG. 2, in various embodiments, for example, in the assembled configuration of the shim 20 in the die 10, the channels 23 extend from the first cavity edge 16, over the cavity 13, and terminate in a plurality of fluid expansion zones 25 prior to reaching the fluid outlet 18 (i.e., each channel ends at a point at which the fluid flowing through the channel is allowed to expand). The channels 23 have a length $l_c$ as measured from the second cavity edge 17 to a start of the fluid expansion zone 25. In various embodiments, the plurality of channels 23 are disposed across the width (i.e., 2W) of the slot 19, thereby preventing cross-flow of fluid in the slot 19 during fluid dispensing. Thus, at least along the length of the channels 23, the fluid in the slot 19 will be separated and contained within the respective channels 23 to inhibit cross-flow of the fluid in the slot 19. In other words, the fingers 22 may overlap at least partially with the cavity 13, and extend toward the fluid outlet 18 to act as barriers to cross-flow of fluid in the slot 19, thereby making it more difficult for the fluid to lose its uniformity while traveling through the slot 19.

Various exemplary embodiments of the disclosure, for example, consider extending the fingers 22 as close as possible to the fluid outlet 18, while maintaining an adequate distance from the free ends 24 to the fluid outlet 18 to minimize and/or prevent wakes in the fluid flow. In various embodiments, to minimize and/or prevent wakes, a distance d (see FIG. 2) between the free ends 24 of the fingers 22 and the fluid outlet 18 (i.e., a fluid exit of the die 10) is greater than or equal to a distance b between adjacent free ends 24 of the fingers 22 (see FIG. 2).

In various exemplary embodiments of the disclosure, the fingers 22 have varying cross-sections along a length of the finger 22. For example, the cross-section may be substantially uniform and relatively large along a length of the fingers 22 such that the gap between the fingers 22 in those regions is small. The cross-section may then change to be relatively small from a portion along the length of the fingers 22 to the free ends 24 of the fingers. As those of ordinary skill in the art would understand, providing one or more decreasing cross-sectional regions (e.g., pointed or inwardly tapering fingers) may reduce wakes in the fluid flow by creating fluid expansion zones 25 between the fingers 22.

FIGS. 2, 3A, 3B, and 5 show various configurations of fingers having decreasing cross-sectional dimensions (e.g., widths) along differing regions of a length of the fingers 22 from the base 21 to the free ends 24. In various exemplary embodiments, it may be desirable to provide a tapered region between the regions of the fingers of differing cross-sectional dimensions so as to provide a gradual transition between two or more cross-sections. In the exemplary embodiment of FIG. 2, for example, a tapered region 28 is closer to the free ends 24 of the fingers 22 than to the ends of the fingers 22 at base 21. As shown in FIG. 2, fingers 22 have two differing cross-sectional regions 64 and 66, wherein the width of each respective region is uniform. In various other embodiments, the two differing cross-sectional regions 64 and 66 get smaller toward the free end 24 of each finger 22 (i.e., the fingers 22 become thinner as they approach the fluid outlet 18). As shown in FIG. 2, the fingers 22 may, for example, have tapered transition region 28 between the two differing cross-sectional regions. A tapered transition region 67 may be provided between cross-sectional region 66 and free end 24.

FIGS. 3A and 3B show other exemplary embodiments of fingers 22 that have three differing cross-sectional regions 34, 36 and 38, wherein each respective region is uniform. In various embodiments, the three differing cross-sectional regions 34, 36 and 38 get smaller toward the free end 24 of each finger 22 (i.e., the fingers 22 become thinner and thinner as they approach the fluid outlet 18). As shown in FIGS. 3A and 3B, the fingers 22 may, for example, have tapered transition regions 35, 37 and 39 between the three differing cross-sectional regions 34, 36 and 38. FIG. 5 shows an additional exemplary embodiment of fingers 22 that has one uniform cross-sectional region 54 and one tapered transition region 55. The tapered transition regions 55 tappers inward toward the free end 24 of each finger 22 to provide gradual expansion of the fluid flowing through channels 53.

It is within the ability of one skilled in the art to determine the appropriate shape and/or configuration of fingers 22 (and resulting fluid expansion zones 25), including the appropriate number and/or configuration of differing cross-sectional regions and tapered transition regions for a particular application. Those of ordinary skill in the art would, therefore, understand that various shapes, sizes, numbers, and/or configurations of cross-sectional regions and tapered regions can be used without departing from the scope of the present disclosure. As shown in FIG. 3A, for example, in various embodiments, the tapered transition regions 35, 37 and 39 are delineated by sharp edges; while in various additional embodiments, as shown in FIG. 3B, the tapered transition regions 35, 37 and 39 are more gradually delineated by curved edges.

Use of a die in accordance with the present disclosure will now be described, with reference to the exemplary embodiment of FIGS. 1 and 2, although it should be understood that the finger configuration of the shim may be any of the configurations described herein, including the modifications as described. During fluid dispensing, pressurized fluid entering the slot 19 from cavity 13 is forced through the channels 23 and into the plurality of fluid expansion zones 25 (i.e., a channel 23 terminates at a fluid expansion zone 25). From the fluid expansion zones 25, the fluid may exit the outlet 18 of the slot 19 where the fluid may then be transferred, for example, as shown for illustrative purposes in FIG. 6, to a substrate 70 moving in a direction A substantially perpendicular to the fluid output 18 of the slot 19 (i.e., substantially parallel to the direction of fluid flow from the slot 19) to apply a coating 71. The channels 23 are configured to provide a high-pressure build up along the slot (i.e., between the second edge 17 of the cavity 13 and the fluid outlet 18) for fluid materials having ultra-low flow rates, thereby providing a substantially uniform fluid flow rate per unit slot width (i.e., 2W) for the fluid exiting the slot 19, and a coating layer that maintains its widthwise uniformity. In various embodiments of the disclosure, for example, the channels 23 are configured to provide a substantially uniform fluid flow rate under flow conditions as defined above with reference to equation [1].

For conventional fluid dispensing systems, which use conventional shims such as a shim 40 illustrated in FIG. 4, it is known that the main criteria for providing uniform flow from a slot coating die is to ensure that the pressure drop along the cavity $\Delta P_c$ (i.e., between a first edge and a second edge of a cavity) is much smaller than the pressure drop along the slot (i.e., between the second edge of the cavity and the fluid output) $\Delta P_s$. A ratio of these pressure drops may be calculated as follows:

$$\frac{\Delta P_c}{\Delta P_s} \propto \left(\frac{\mu_c}{\mu_s}\right)\left(\frac{W^2 h^3}{LA^2}\right) \quad [2]$$

wherein $\mu_c$ and $\mu_s$ are characteristic viscosities of the flow in the cavity and slot, respectively; W and L are shown in FIG. 4, respectively, as the half width of the coating and the length of the slot, from the outer rim of the cavity to the fluid output; A is the cross sectional area across the cavity in a plane that is parallel to the main flow in the slot and perpendicular to the slot walls; and h is the height of the slot, which is defined by (and is the same as) the thickness of the shim. The proportionality factor in the equation refers mainly to an undefined constant which is of the order of unity.

The assumptions underlying the criterion provided by the above equation are that the main pressure drops in a slot coating die are the pressure drop along the slot (i.e., along a length of the slot between the cavity and the outlet of the slot) and the pressure drop along the cavity (i.e., between the inlet to an edge of the cavity), and that the former is generally much larger than the latter. It is, therefore, generally implicitly assumed that the variation of the pressure across a coating meniscus (i.e., the free surface of a coating bead) is negligible. As also provided, however, an estimate can be made of the pressure across the meniscus by combining the Young-Laplace relationship for the pressure difference across a coating meniscus, the mass conservation in the coated fluid film, and the relationship of the wet fluid film thickness to the radius of curvature of the meniscus, as provided below:

$$\Delta P_b = 1.34 \frac{\mu_b^{2/3} S^{2/3} \sigma^{1/3}}{\delta} \quad [3]$$

wherein S is the speed of the substrate surface being coated, $\delta$ is the thickness of the wet fluid film just as it is coated, $\sigma$ is the surface tension of the liquid-gas interface, $\mu_b$ is the effective viscosity at the coating bead, and $\Delta P_b$ is the pressure drop across the curved interface at the bead (i.e., a pressure drop across the top of a coating meniscus at the air/liquid interface).

As one of ordinary skill in the art would understand, the flow in a slot of a slot coating die can be represented as flow between two parallel plates (i.e., one of the simplest types of flow known in the art). The pressure drop along the slot can, therefore, be expressed using a known relation, as:

$$\Delta P_s = 12 \frac{\mu_s Q L}{W h^3} \quad [4]$$

wherein 2Q is the total flow rate entering the cavity and emerging from the fluid outlet, and $\Delta P_s$ is the pressure drop along the slot (i.e., the pressure drop between the cavity and the fluid outlet). As one of ordinary skill in the art would further understand, mass conservation then requires that the total flow in the wet fluid film (i.e., the fluid coating) be equal to the total flow entering the fluid inlet of the die:

$$\delta = \frac{Q}{SW} \quad [5]$$

The combination of equations [3], [4] and [5] may, therefore, yield a ratio of the pressures drops in the bead $\Delta P_b$ (i.e., the pressure drop across the top of a coating meniscus) and the slot $\Delta P_s$ (i.e., the pressure drop between the cavity and the fluid outlet):

$$\frac{\Delta P_b}{\Delta P_s} = 0.112 \frac{h^3 \mu_b^{2/3} \sigma^{1/3}}{\mu_s L \delta^2 S^{1/3}} \quad [6]$$

As discussed above, however, various coating fluids exhibit ultra-low flow conditions, wherein the viscosity, film thickness and coating speed are substantially lower than with traditional coating fluids. Although not wishing to be bound by any particular theory, the inventor believes that as a result, when using such fluids, the ratio of the pressure drop across the bead's interface (i.e., the coating meniscus) can be significant when compared to the pressure drop along the slot, resulting in coatings of erratic widths.

The present disclosure teaches a shim design, for use in slot coating dies, which may recover the controlling role of the pressure drop along the slot $\Delta P_S$ (e.g., the pressure drop between the second edge 17 of the cavity 13 and the fluid outlet 18), thereby recovering a shim's performance as a manifold to control fluid flow under ultra-low flow conditions. As discussed in detail above, a high-pressure build up along the slot can be maintained for ultra-low flow fluid materials by forming a plurality of separate flow channels in the shim that are disposed across a width (e.g., 2W as shown in FIGS. 2, 4 and 5) of the slot defined by the shim (i.e., by incorporating fingers across a width (e.g., 2W as shown in FIGS. 2, 4 and 5) of the slot that are elongated in the lengthwise direction of the shim as shown in the figures). As illustrated in FIGS. 1 and 2, for example, in various embodiments, the channels 23 can be equally spaced apart from one another and equally wide.

With reference now to FIG. 5, which shows an exemplary embodiment of a shim 50 in accordance with the disclosure, if there are n channels 53 across a width (i.e., 2W) of the slot 59, each of width $W_c$ and effective length $l_c$, then the pressure drop along the slot 59 $\Delta P_S$ will be greater than the pressure drop along a channel 23 $\Delta P'_S$, defined by the following relation:

$$\Delta P'_s \geq 24\alpha \frac{\mu_c Q l_c}{(h')^3 n W_c} \qquad [7]$$

wherein, as above, $\mu_c$ is the effective viscosity in a channel 23; 2Q is the total flow rate entering the cavity and emerging from the fluid outlet; h' is the height of the channel, which is defined by (and is the same as) the thickness of the shim; and $\alpha=1$ if the die is center fed and $\alpha=\frac{1}{2}$ if the die is side-fed.

The pressure drop along the slot $\Delta P_S$ will, therefore, be greater than the pressure drop along the slot for a conventional shim (e.g., shim 40 of FIG. 4), when:

$$\frac{\Delta P'_s}{\Delta P_s} \geq \alpha \left(\frac{\mu_c}{\mu_s}\right)\left(\frac{2W}{nW_c}\right)\left(\frac{l_c}{L}\right)\left(\frac{h}{h'}\right) \qquad [8]$$

wherein $\Delta P'_s$ is the pressure drop along a channel and $\Delta P_S$ is the pressure drop along a slot without channels (i.e., using a conventional shim 40 as illustrated in FIG. 4); and $\alpha=1$ if the die is center fed and $\alpha=\frac{1}{2}$ if the die is side-fed.

Thus, in various embodiments of the disclosure, the channels are configured such that a pressure drop along the slot is greater than a pressure drop along the channels during fluid dispensing. In other words, the channels are configured such that a pressure drop along the channels is less than a pressure drop from a fluid inlet of the slot to a fluid exit of the slot during fluid dispensing. In various embodiments, for example, the channels are configured such that a pressure drop along the slot is greater than a pressure drop across a coating meniscus during fluid dispensing.

Again, while not wishing to be bound by any particular theory, the inventor believes that the fingers of the shim designs of the present disclosure will not cause significant wakes in the fluid flowing in the slot when using fluids with ultra-low flow rates based on the speed of the flow being relatively slow and of the Hele-Shaw type. As would be understood by those of ordinary skill in the art, Hele-Shaw type flows in a slot are substantially identical to two dimensional ideal inviscid flows; therefore, the flow may recover uniformity very quickly downstream of an obstruction.

Furthermore, shims like the exemplary shims in FIGS. 1, 2 and 5, which can incorporate various finger configurations including those in FIGS. 3A and 3B, may provide more uniform fluid coatings (and of the desired width), because the flow rate immediately downstream of the free ends 24 is lower than the flow rate immediately downstream of the channels 23 (i.e., in the fluid expansion zones 25). Thus, the fluid film thickness δ would be less downstream of the free ends 24 then downstream of the channels 23. As equation [3] illustrates, however, the pressure drop across the coating meniscus $\Delta P_b$ is inversely proportional to δ. Therefore, during fluid dispensing, fluid in the slot will be pulled towards points along the fluid outlet immediately downstream of the free ends 24 (i.e., into the areas of thin fluid film thickness δ), thereby self-correcting the fluid coating's uniformity.

Accordingly, as discussed in detail above, in various exemplary embodiments, the channels (defined by obstructions, such as, for example, fingers in the slot) are configured to provide a substantially uniform fluid flow rate under ultra-low flow conditions.

In various additional exemplary embodiments, the disclosure relates to methods for dispensing a fluid using the fluid dispensing systems and shims described herein. More specifically, with reference to FIGS. 1 and 2, a method for dispensing a fluid may comprise introducing a fluid for dispensing into a cavity 13, the cavity 13 being in fluid communication with a slot 19 of a slot coating die 100; and flowing the fluid from the cavity 13 through a plurality of channels 23 disposed in the slot 19. It is within the ability of one skilled in the art to select an appropriate method for introducing a fluid for dispensing into the cavity 13, including for example, through one or more fluid inlets, such as fluid inlet 14, in fluid communication with the cavity 13. It is also within the ability of one skilled in the art to select an appropriate method for flowing the fluid from the cavity 13 through the plurality of channels 23 disposed in the slot 19 of the slot coating die 100. In various embodiments, for example, flowing the fluid through the plurality of channels 23 may comprise flowing the fluid through channels 23 defined by a plurality of fingers 22 in the slot 19.

In various exemplary embodiments, flowing the fluid through the plurality of channels 23 may comprise flowing a fluid under ultra-low flow conditions. In various embodiments, for example, flowing the fluid through the plurality of channels 23 may comprise flowing a fluid under flow conditions as expressed by equation [1]. In various embodiments, flowing the fluid through the plurality of channels may, therefore, comprise flowing a fluid comprising, among other things, nanoparticles, nanotubes, polytetrafluoroethylene, acetal polyoxmethylene, and/or fluoropolymers through the plurality of channels 23.

In various exemplary embodiments, fluid flowing from the channels 23 may expand into a plurality of fluid expansion zones 25, so that fluid flow may become uniform prior to reaching a fluid outlet 18 of the slot 19.

Figure 6:
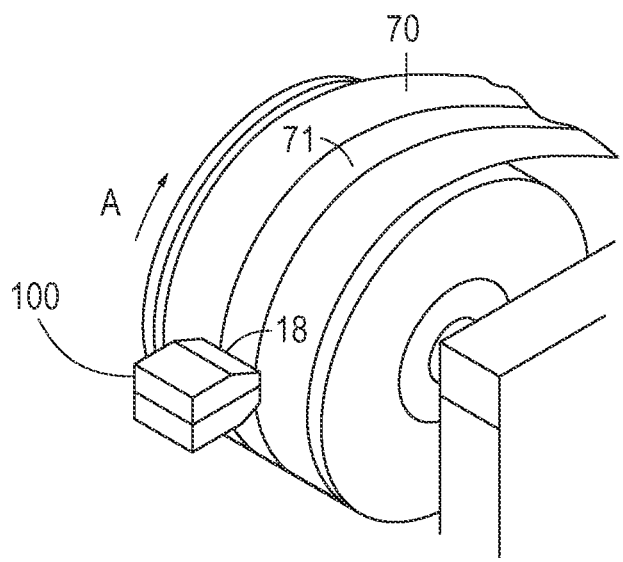
FIG. 6 is a perspective view of an exemplary embodiment of a fluid dispensing system positioned to dispense a fluid coating onto a substrate.

With reference now to FIG. 6, in various additional exemplary embodiments, a method for dispensing a fluid may further comprise moving a substrate 70 adjacent to the fluid outlet 18 of the slot 19 to apply the fluid 71 thereto. It is within the ability of one skilled in the art to select an appropriate method for moving a substrate adjacent to the slot, including for example, rotating a coating roll or drum (see FIG. 6), or by using various web transport systems known to those skilled in the art.

To validate and confirm the effectiveness of fluid dispensing systems and methods in accordance with the present disclosure, experimental tests were run to demonstrate exemplary fluid coatings applied using a conventional shim (see FIG. 4) and a shim in accordance with the present disclosure (see FIG. 5) as shown and described below with reference to Tables 1 and 2.

EXAMPLE 1

During a first test, a first fluid coating was applied to a substrate from a patch slot coater as would be understood by those of ordinary skill in the art. The parameters used in the test, including, the physical properties of the fluid, the slot geometric dimensions, and coating conditions are given below in Table 1.

TABLE 1

| Fluid Properties | Slot Geometric Dimensions | Coating Conditions |
| --- | --- | --- |
| Surface tension σ = 13 mN · m | Slot length L = 20 mm | Wet film thickness δ = 6 μm |
| Viscosity μ = 0.6 mPa · s | Coating half-width W = 50 mm | Coating speed S = 50 mm/s |
| | Slot height h = 50 μm | |
| | Cavity cross-sectional area A = 50 mm² | |

For this test, the fluid appeared Newtonian, and all the effective viscosities were assumed to be the same and equal to the measured viscosity (i.e., μ=0.6 mPa·S). Using equation [2], a conventional ratio of cavity to slot pressure drop was calculated to yield $\Delta P_c/\Delta P_s \propto 6.2*10^{-6}$, which suggested that a conventional fluid dispensing system (e.g., utilizing a conventional shim design as illustrated in FIG. 4) should provide a uniform coating (i.e., because the ratio provided a relatively small number compared to unity). When the fluid was dispensed using a conventional slot die coating fluid dispensing system, however, the fluid coating was observed to "neck in". Using equation [6], a ratio of pressure drop across the coating meniscus to the pressure drop along the slot was then computed, finding that $\Delta P_b/\Delta P_s=0.15$. This relatively large number (as compared to $6.2*10^{-6}$) suggested that the pressure variation in the bead could be comparable to that along the slot.

The shim utilized by the fluid dispensing system was then exchanged for a shim in accordance with the disclosure (e.g., the shim illustrated in FIG. 5). The shim had dimensions of $l_c$=10 mm, $W_c$=0.5 mm and n=20. Using equation [8], a ratio of slot pressure drops of $\Delta P'_s/\Delta P_s \geq 5$ was calculated, which indicated that the new shim design should effectively increase the back pressure in the slot (i.e., as indicated by the relatively large ratio of 5). Using equation [6], it was, therefore, implied that $\Delta P_b/\Delta P'_s \leq 0.03$ (which was a significant reduction from $\Delta P_b/\Delta P_s=0.15$), and that the higher pressure drop should stop the "necking in" of the coating bead. As expected, when the fluid was dispensed using a fluid dispensing system of the disclosure, the fluid coating was applied with a uniform thickness (i.e., without "necking in").

EXAMPLE 2

During a second test, a second fluid coating was applied to a substrate using a continuous slot coating as would be understood by those of ordinary skill in the art. The parameters used in the test, including, the physical properties of the fluid, the slot geometric dimensions, and coating conditions are given below in Table 2.

TABLE 2

| Fluid Properties | Geometric Dimensions | Coating Conditions |
| --- | --- | --- |
| Surface tension σ = 30 mN · m | Slot length L = 20 mm | Wet film thickness δ = 10 μm |
| Viscosity μ = 125 mPa · s | Coating half-width W = 50 mm | Coating speed S = 50 mm/s |
| | Slot height h = 178 μm | |
| | Cavity cross-sectional area A = 50 mm² | |

For this test, the coating liquid was a slurry. It was, therefore, found that slot heights lower than 127 μm trapped particles and plugged the slot. Repeating the calculations of the first example for a conventional dispensing system (e.g., utilizing a conventional shim design as illustrated in FIG. 4), it was found that $\Delta P_c/\Delta P_s \propto 2.8*10^{-4}$ and $\Delta P_b/\Delta P_s=0.53$, with the same results as before (i.e., the fluid coating was observed to "neck in").

As before, the shim utilized by the fluid dispensing system was then exchanged for a shim in accordance with the disclosure (e.g., the shim illustrated in FIG. 5). The shim had dimensions of $l_c$=10 mm, $W_c$=1.0 mm and n=20 (i.e., across the width 2W). Using equation [8], a ratio of slot pressure drops of $\Delta P'_s/\Delta P_s \geq 2.5$ was calculated, which indicated that the new shim design should effectively increase the back pressure in the slot (i.e., as indicated by the relatively large ratio of 2.5). Using equation [6], it was therefore implied that $\Delta P_b/\Delta P'_s \leq 0.25$ (which showed some improvement from $\Delta P_b/\Delta P_s=0.53$), and that the higher pressure drop should stop the "necking in" of the coating bead. Once again, as expected, when the fluid was dispensed using a fluid dispensing system of the disclosure, the fluid coating was applied with a uniform thickness (i.e., without "necking in").

Thus, the results shown in Examples 1 and 2 demonstrate that a fluid dispensing system that comprises a shim defining a plurality of channels may provide a high-pressure build up along the slot for fluids having low viscosities and ultra-low flow rates. Accordingly, systems and methods for dispensing fluids in accordance with the disclosure, can be implemented to provide a coating layer that maintains its widthwise uniformity without, for example, the need for edge guides. The systems and methods for dispensing fluids in accordance with the disclosure may therefore reduce coating bead failure, thereby providing quick start up times for coating and printing processes utilizing fluids having low viscosities and ultra-low flow rates.

Those having ordinary skill in the art would understand that the fluid properties, the geometric dimensions, and the coating conditions described above and used for the tests are exemplary only and that other properties, dimensions, and/or operating conditions may be chosen depending on various factors without departing from the disclosure.

Although various exemplary embodiments described herein relate to systems and methods for dispensing fluids to a moving substrate, such as, for example, a moving web, via a slot coating die, those having ordinary skill in the art would understand that the teachings of that application provide an exemplary fluid dispensing approach and are not intended to limit the present disclosure or the claims. Those having ordinary skill in the art would, therefore, understand that the systems and methods of the disclosure contemplate dispensing a fluid coating via any process and/or method, including, but not limited to, slot die coating, extrusion coating, patch-coating, continuous coating, curtain coating, and slide-bead coating. The fluid dispensing system may be used to form the top-most layer (e.g., final layer) of a single-layer or multi-layer structure. The shim design disclosed in the exemplary embodiments of the disclosure is independent of the coating technique used.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein.

It should be understood that while the disclosure has been described in detail with respect to certain exemplary embodiments thereof, it should not be considered limited to such, as numerous modifications are possible without departing from the broad scope of the appended claims.

I claim:

1. A shim for a slot coating die, the shim comprising:
   a base portion defining an edge; and
   fingers extending lengthwise in a first direction from the edge of the base portion,
   wherein each finger tapers toward a free end thereof and comprises:
      a first cross-sectional region having a first length and a uniform first width along the first length;
      a second cross-sectional region having a second length and a uniform second width along the second length, the second width being smaller than the first width; and
      a first tapered region connecting the first and second cross-sectional regions, wherein the shim is configured to be positioned between a first die portion and a second die portion of a slot coating die such that the fingers extend over a fluid dispensing cavity of the slot coating die, the shim in combination with the first and second die portions defines a slot within the slot coating die, and the shim is configured such that a distance between the free ends of adjacent fingers is less than a distance between the free ends and an outlet of the slot.

2. The shim of claim 1, wherein the fingers at least partially define channels that extend in the first direction.

3. The shim of claim 2, wherein the fingers are configured such that a pressure drop along the channels is less than a pressure drop from a fluid inlet of the slot of the slot coating die to a fluid outlet of the slot during fluid dispensing.

4. The shim of claim 2, wherein the fingers are configured such that a pressure drop along the slot is greater than a pressure drop across a meniscus of fluid at a coating surface during fluid dispensing.

5. The shim of claim 2, wherein the fingers are configured such that the channels provide a substantially uniform fluid flow rate under ultra-low flow conditions.

6. The shim of claim 1, wherein the fingers each comprise:
   a third cross-sectional region having a third length and a uniform third width along the third length, the third width being smaller than the second width; and
   a third tapered region connected to the third cross-sectional region and forming the free end thereof.

7. The shim of claim 1, wherein the first cross-sectional regions extend from the base portion.

8. The shim of claim 1, wherein the first length is greater than the second length.

9. A shim for a slot coating die, the shim comprising:
   a base portion defining an edge; and
   fingers extending lengthwise in a first direction from the edge of the base portion,
   wherein each finger tapers toward a free end thereof and comprises:
      a first cross-sectional region having a first length and a uniform first width;
      a second cross-sectional region having a second length and a uniform second width along the second length, the second width being smaller than the first width;
      a third cross-sectional region having a third length and a uniform third width along the third length, the third width being smaller than the second width;
      a first tapered region connecting the first and second cross-sectional regions; and
   a second tapered region connecting the second and third cross-sectional regions, wherein the fingers each comprise a third tapered region connected to the third cross-sectional region and forming the free end thereof.

10. The shim of claim 9, wherein:
the first length is greater than the second length; and
the second length is greater than the third length.

* * * * *